(12) United States Patent
Skodras et al.

(10) Patent No.: US 6,868,188 B2
(45) Date of Patent: Mar. 15, 2005

(54) EFFICIENT DOWN-SCALING OF DCT COMPRESSED IMAGES

(75) Inventors: Athanasios Skodras, Patras (GR); Charilaos Christopoulos, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 684 days.

(21) Appl. No.: 09/734,042

(22) Filed: Feb. 13, 2001

(65) Prior Publication Data

US 2001/0006561 A1 Jul. 5, 2001

Related U.S. Application Data

(63) Continuation of application No. PCT/SE99/01049, filed on Jun. 14, 1999.

(30) Foreign Application Priority Data

Jun. 26, 1998 (SE) .............................................. 9802286

(51) Int. Cl.$^7$ ................................................ G06K 9/36
(52) U.S. Cl. ................................... 382/250; 375/240.2
(58) Field of Search ............................... 382/248–250, 382/232–239; 375/240.18–240.2

(56) References Cited

U.S. PATENT DOCUMENTS

| | | | |
|---|---|---|---|
| 4,293,920 A | 10/1981 | Merola | |
| 5,107,345 A | 4/1992 | Lee | |
| 5,293,434 A | 3/1994 | Feig et al. | |
| 5,363,096 A | 11/1994 | Duhamel et al. | |
| 5,452,104 A | 9/1995 | Lee | |
| 5,479,364 A * | 12/1995 | Jones et al. | ................. 708/402 |
| 5,485,279 A | 1/1996 | Yonemitsu et al. | |
| 5,485,533 A * | 1/1996 | Hatano et al. | ............... 382/250 |
| 5,528,533 A | 6/1996 | Kitaura et al. | |
| 5,537,440 A | 7/1996 | Eyuboglu et al. | |
| 5,541,852 A | 7/1996 | Eyuboglu et al. | |
| 5,594,678 A * | 1/1997 | Jones et al. | ................. 708/402 |
| 5,835,151 A * | 11/1998 | Sun et al. | ................. 375/240.2 |
| 5,854,858 A | 12/1998 | Girod et al. | |
| 5,870,146 A | 2/1999 | Zhu | |
| 6,031,572 A * | 2/2000 | Christopoulos | .......... 375/240.1 |
| 6,192,081 B1 | 2/2001 | Chiang et al. | |
| 6,577,767 B2 * | 6/2003 | Lee | ............................ 382/250 |

FOREIGN PATENT DOCUMENTS

WO    98/41929 A2    9/1998

OTHER PUBLICATIONS

*IEEE Transactions On Signal Processing*, vol. 41, No. 1, Jan. 1993, pp. 480–485, N. Rama Murthy et al., "On a Novel Decomposition of the DCT and its Application".

*Digital Image Processing Volume*, 1987 (Addison–Wesley Publishing Company), Reading, Mass et al., R.C. Gonzales et al., pp. 100–105; pp. 121–122.

U.S. patent application Ser. No. 09/394,428, filed Sep. 13, 1999 entitled "Down Scaling of Images".

* cited by examiner

*Primary Examiner*—Jingge Wu
(74) *Attorney, Agent, or Firm*—Nixon & Vanderhye, P.C.

(57) ABSTRACT

In a method and a device for calculation of the Discrete Cosine Transform (DCT) only the DCT coefficients representing the first half and the second half of an original sequence are required for obtaining the DCT for the entire original sequence. The device and the method are therefore very useful when calculations of DCTs of a certain length is supported by hardware and/or software, and when DCTs of other sizes are desired. Areas of application are for example still image and video transcoding, as well as scalable image and/or video coding and decoding.

30 Claims, 3 Drawing Sheets

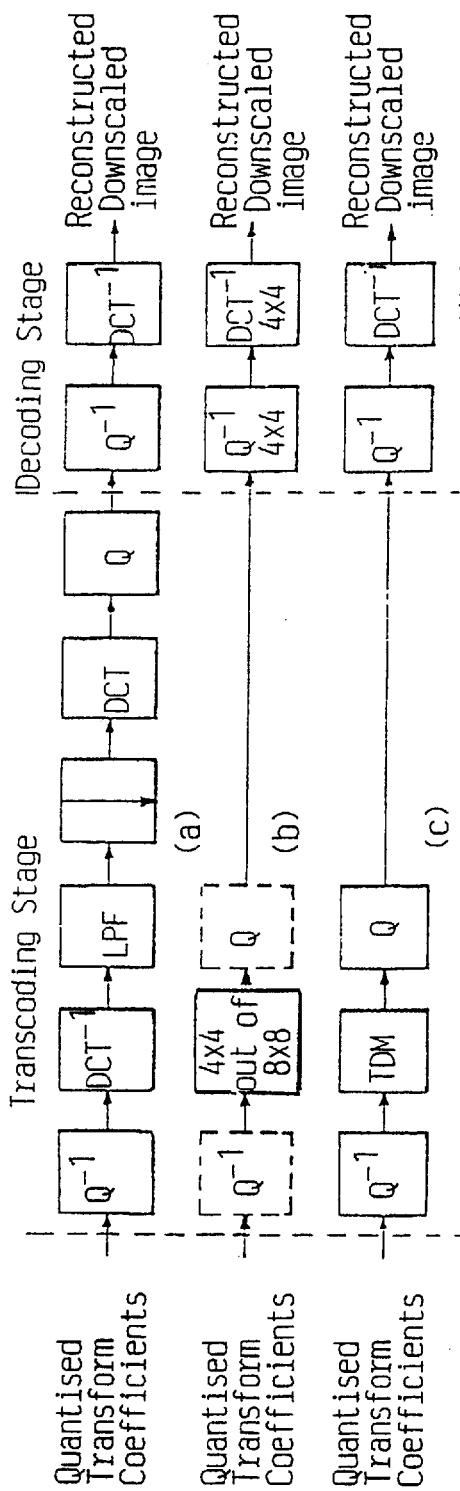
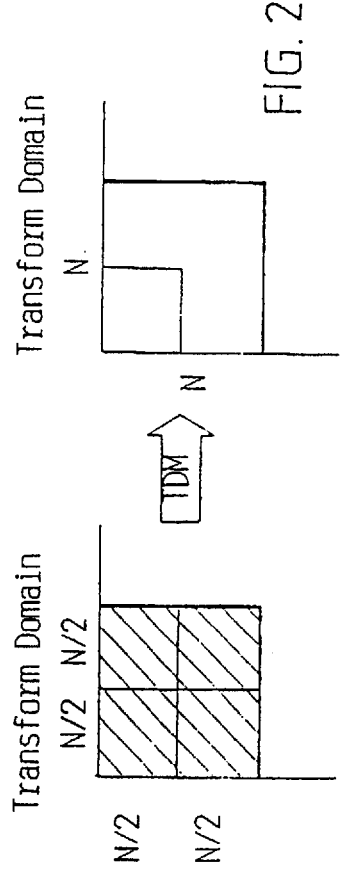
FIG. 1
FIG. 2

→ Multiplication by 1/sqrt(2)   FIG.3b

EFFICIENT DOWN-SCALING OF DCT COMPRESSED IMAGES

This application is the continuation application of the PCT/US99/01049 filed 14 Jun. 1999 which designates the U.S. PCT/US99/01049 claims priority to SE Application No. 9802286-6 filed 26 Jun. 1998. The entire contents of these applications are incorporated herein by reference.

TECHNICAL FIELD

The present invention relates to a method and a device for scaling DCT compressed images.

BACKGROUND OF THE INVENTION AND PRIOR ART

The emergence of the compression standards JPEG, MPEG, H.26x has enabled many consumer and business multimedia applications, where the multimedia content is disseminated in its compressed form. However, many applications require processing of the multimedia content prior to presentation. A very frequent process is that of down-sampling (down-scaling, down-sizing) the compressed image.

Thus, in applications, such as image and video browsing, it may be sufficient to deliver a lower resolution image or video to the user. Based on user's input, the media server could then provide the higher resolution image or video sequence.

Also, composting several MPEG video sources into a single displayed stream is important for MPEG video applications as for example advanced multimedia terminals, interactive network video and multi-point video conferencing. Composting video directly in the compressed domain reduces computational complexity by processing less data and avoiding the conversion process back and forth between the compressed and the uncompressed data formats. In compression standards (MPEG, H.26x), compression is computationally 3 to 4 times more expensive than decompression. Compressed domain based down-sampling can be used to implement an efficient picture-in-picture system for MPEG compressed video and can result in significant savings.

Furthermore, efficient transcoding should be able to cope with different quality of services in the case of multi-point communications over POTS, ISDN, and ADSL lines. A HDTV down conversion decoder can decode the Grand Alliance HDTV bitstreams and display them on SDTV or NTSC monitors.

Conventional techniques for down-scaling rely on decompressing the bitstreams first and then applying the desired processing function (re-compression).

The down-sampling of a still image in the spatial domain consists of two steps. First the image is filtered by an anti-aliasing low pass filter and then it is sub-sampled by a desired factor in each dimension. For a DCT-compressed image, the above method implies that the compressed and quantised image has to be recovered first into the spatial domain by inverse DCT (IDCT or $DCT^{-1}$) and then undergo the procedure of filtering and down-sampling as illustrated in FIG. 1a.

A direct approach would be to work in the compressed domain, where both operations of filtering and down-sampling are combined in the DCT domain. This could be done by cutting off DCT coefficients of high frequencies and using the IDCT with a smaller number of coefficients to reconstruct the reduced resolution image. For example, one could use the 4×4 coefficients out of the 8×8 and perform the IDCT on these coefficients in order to reduce the resolution by a factor of 2 in each dimension as illustrated in FIG. 1b. This technique does not result in significant compression gains and requires encoders and decoders to be able to handle 4×4 DCTs and IDCTS. It also requires run-length coding schemes to be optimised for the 4×4 case. Furthermore, this method results in significant amount of blocking effects and distortions, due to the poor approximations introduced by simply discarding higher order coefficients.

This technique would be more useful if 16×16 DCT blocks was used and were 8×8 DCT coefficients were kept in order to obtain the down-sampled. However, most image and video compression standards, like JPEG, H.26x, and MPEG, segment the images into rectangular blocks of size 8×8 pixels and apply the DCT on these blocks. Therefore, only 8×8 DCTs are available. One way to compute the 16×16 DCT coefficients is to apply inverse DCT in each of the 8×8 blocks and reconstruct the image.

Then the DCT in blocks of size 16×16 could be applied and the 8×8 out of the 16×16 DCTs coefficients of each block could be kept. This would lead to a complete decoding (performing 8×8 IDCTS) and re-transforming by 16×16 DCTs, something that would require 16×16 DCT hardware or software.

However, if one could compute the 8×8 out of the 16×16 DCT coefficients by using only 8×8 transformations, then this method would be faster and it would perform better than the one that uses the 4×4 out of the 8×8. This would also mean that by avoiding the computation of DCTs of size 16×16, the memory requirements could also be reduced as illustrated in FIG. 1c.

Furthermore, in the international patent application PCT/SE98/00448 a method and a device for encoding/decoding DCT compressed images in the frequency domain are described, and which application is hereby is enclosed herein by reference.

SUMMARY

It is an object of the present invention to provide a more efficient encoding/decoding/transcoding algorithm for obtaining the DCT coefficients of a block from DCT coefficients of the four adjacent blocks than the algorithms described in the above international application PCT/SE98/00448.

This object is obtained by a device and a method as set out in the appended claims.

Thus, by using the coding/decoding algorithm as described herein a very efficient computation of an N×N point DCT given the N/2×N/2 DCT coefficients for four adjacent blocks is achieved. All the operations are performed in the transform domain, so called transform domain manipulation (TDM).

BRIEF DESCRIPTION OF THE DRAWINGS

The present invention will now be described in more detail and with reference to the accompanying drawings, in which:

FIGS. 1a–1c illustrates different techniques of down scaling an image according to the prior art.

FIG. 2 illustrates the operation of combining four adjacent DCT blocks.

FIGS. 3a and 3b show flow graphs for the calculation of an N point DCT, by the two adjacent N/2 DCTs.

DETAILED DESCRIPTION

Figure 3A:
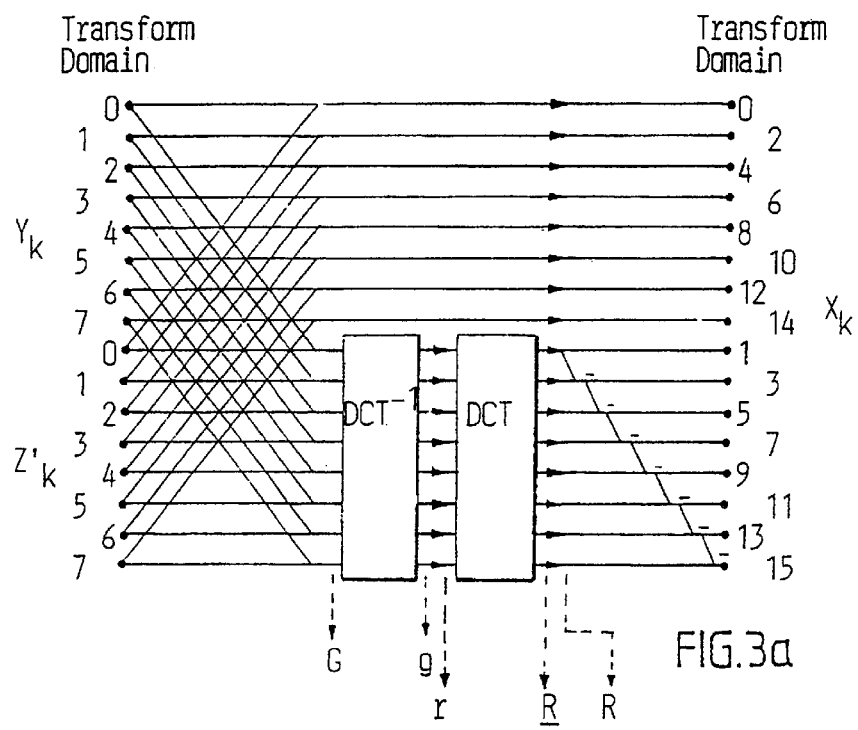

In order to simplify the notation and discussion the 1-D down-sampling analysis is presented. Because the DCT is separable, all results extend to the 2-D case by simply applying the properties in each of the two dimensions consecutively.

Assume that the DCT coefficients $Y_k$ and $Z_k$, (k=0, 1, . . . , (N/2)−1), of two consecutive data sequences $y_n$ and $z_n$, (n=0, 1, . . . , (N/2)−1), are given, where $N=2^m$. The problem to be addressed is the efficient computation of $X_k$, (k=0, 1, . . . , N−1) directly in the DCT domain, given $Y_k$ and $Z_k$, where $X_k$ are the DCT coefficients of $x_n$, (n=0, 1, . . . , N−1), the sequence generated by the concatenation of $y_n$ and $z_n$. The normalised forward DCT (DCT-II) and inverse DCT (IDCT) of the length-N sequence $x_n$ are given by the following equations:

$$X_k = \sqrt{\frac{2}{N}} \varepsilon_k \sum_{n=0}^{N-1} x_n \cos\frac{(2n+1)k\pi}{2N}, k = 0, 1, \ldots, N-1 \text{ and}$$

$$x_n = \sqrt{\frac{2}{N}} \sum_{k=0}^{N-1} \varepsilon_k X_k \cos\frac{(2n+1)k\pi}{2N}, n = 0, 1, \ldots, N-1$$

where $\epsilon_k=1/\sqrt{2}$ for k=0 and $\epsilon_k=1$ for k≠0. Notice that $\epsilon_{2k}=\epsilon_k$ and $\epsilon_{2k+1}=1$.

The normalised DCT and IDCT for the length—(N/2) sequences $y_n$ and $z_n$ are given by similar expressions, where in this case N is substituted by N/2.

The computation is performed separately for the even- and the odd-indexed coefficients.

i. Even-Indexed Coefficients $$X_{2k} = \sqrt{\frac{2}{N}} \varepsilon_{2k} \sum_{n=0}^{N-1} x_n \cos\frac{(2n+1)2k\pi}{2N}$$

$$= \sqrt{\frac{2}{N}} \varepsilon_k \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos\frac{(2n+1)k\pi}{2(N/2)} + \sum_{n=0}^{\frac{N}{2}-1} x_{N-1-n} \cos\left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\}$$

$$= \sqrt{\frac{1}{2}} [Y_k + (-1)^k Z'_k] = \sqrt{\frac{1}{2}} [Y_k + Z'_k] \quad k = 0, 1, \ldots, (N/2)-1.$$

where $Z'_k$ is the DCT of $z'_n = x_{N-1-n}, n = 0, 1, \ldots, (N/2)-1$.

ii. Odd-Indexed Coefficients $$X_{2k+1} + X_{2k-1} = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} (y_n - z'_n) 2\cos\frac{(2n+1)\pi}{2N} \cos\frac{(2n+1)k\pi}{2(N/2)} \right\} \text{ or}$$

$$X_{2k+1} = \frac{1}{\varepsilon} \sqrt{\frac{1}{2}} \left\{ \sqrt{\frac{2}{N/2}} \varepsilon_k \sum_{l=0}^{\frac{N}{2}-1} r_n \cos\frac{(2n+1)k\pi}{2(N/2)} \right\} - X_{2k-1},$$

where $k = 0, 1, \ldots, (N/2)-1$ and $$r_n = (y_n - z'_n) 2\cos\frac{(2n+1)\pi}{2N}$$

$$= \left\{ \sqrt{\frac{2}{N/2}} \sum_{l=0}^{\frac{N}{2}-1} \varepsilon_l (Y_l - Z'_l) \cos\frac{(2n+1)l\pi}{2(N/2)} \right\} 2\cos\frac{(2n+1)\pi}{2N}$$

$r_n$ is a length-(N/2) DCT of the length-(N/2) IDCT of ($Y_1$–$Z_1'$) multiplied by 2cos(2 n+1)π/2N. The flow graph of the proposed algorithm for the case of the concatenation of two 8-point adjacent coefficient sequences (i.e. N=16), is depicted in FIG. 3a. Down-sampling by a factor of 2 implies that only coefficients 0, 2, 4, 6, 1, 3, 5, 7 have to be calculated.

Figure 4:
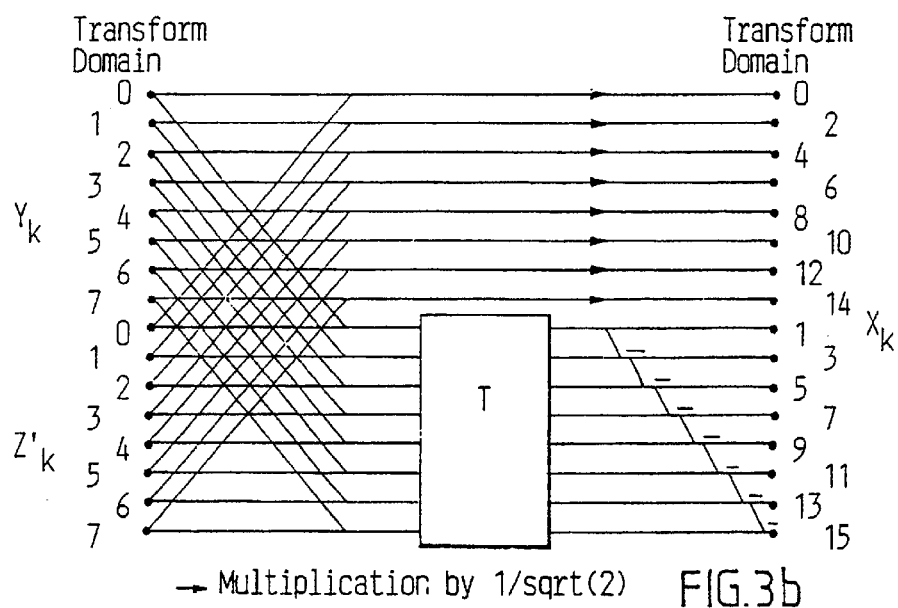
FIG. 4 is a block diagram illustrating a matrix multiplication.
Figure 4:
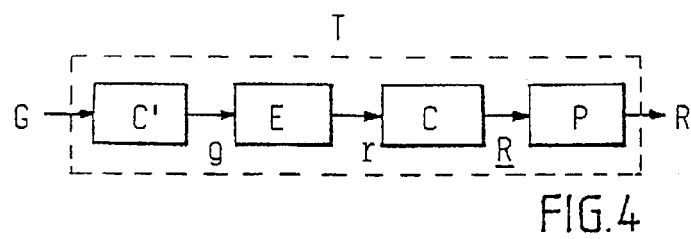

The calculation of the odd-indexed coefficients could be further simplified if the processes of $DCT^{-1}$, DCT and the multiplications were substituted by a matrix multiplication as shown in FIG. 3b. A block diagram of the steps needed for these calculations is illustrated in FIG. 4.

In the special case of N=16 that is under consideration, we have:

$G=Y_1-Z_1'$ is a column vector of length 8 each element of which equals to the difference of the corresponding input DCT coefficients.

$g=C^{-1}\cdot G$ is a column vector of length 8 corresponding to the IDCT of G, where $C^{-1}=C^T$ (C given below).

$r=E\cdot g$ is a column vector of length 8 each element of which is the product of g by $2\cos(2n+1)\pi/2N$, where n=0, 1, ..., 7 and N=16. E is a diagonal matrix and is given by $E=2\ diag\{\cos(\pi/32), \cos(3\pi/32), \cos(5\pi/32), \cos(7\pi/32), \cos(9\pi/32), \cos(11\pi/32), \cos(13\pi/32), \cos(15\pi/32)\}$.

$\underline{R}=C\cdot r$ is a column vector of length 8 corresponding to the DCT of r, where $$C = \sqrt{\frac{2}{N/2}} \begin{bmatrix} \sqrt{1/2} & \sqrt{1/2} & \sqrt{1/2} & \sqrt{1/2} & \sqrt{1/2} & \sqrt{1/2} & \sqrt{1/2} & \sqrt{1/2} \\ \cos(\theta) & \cos(3\theta) & \cos(5\theta) & \cos(7\theta) & \cos(9\theta) & \cos(11\theta) & \cos(13\theta) & \cos(15\theta) \\ \cos(2\theta) & \cos(6\theta) & \cos(10\theta) & \cos(14\theta) & \cos(18\theta) & \cos(22\theta) & \cos(26\theta) & \cos(30\theta) \\ \cos(3\theta) & \cos(9\theta) & \cos(15\theta) & \cos(21\theta) & \cos(27\theta) & \cos(33\theta) & \cos(39\theta) & \cos(45\theta) \\ \cos(4\theta) & \cos(12\theta) & \cos(20\theta) & \cos(28\theta) & \cos(36\theta) & \cos(44\theta) & \cos(52\theta) & \cos(60\theta) \\ \cos(5\theta) & \cos(15\theta) & \cos(25\theta) & \cos(35\theta) & \cos(45\theta) & \cos(55\theta) & \cos(65\theta) & \cos(75\theta) \\ \cos(6\theta) & \cos(18\theta) & \cos(30\theta) & \cos(42\theta) & \cos(54\theta) & \cos(66\theta) & \cos(78\theta) & \cos(90\theta) \\ \cos(7\theta) & \cos(21\theta) & \cos(35\theta) & \cos(49\theta) & \cos(63\theta) & \cos(77\theta) & \cos(91\theta) & \cos(105\theta) \end{bmatrix}$$

and $\theta = \pi/N$, $N = 16$.

$R=P\cdot\underline{R}$ is a column vector of length 8 each element of which is the product of R by $\sqrt{1/2}$, except for the first element that is multiplied by ½, i.e. matrix P equals to: $P=diag\{½, \sqrt{1/2}, \sqrt{1/2}, \sqrt{1/2}, \sqrt{1/2}, \sqrt{1/2}, \sqrt{1/2}, \sqrt{1/2}\}$.

Taking into account all the above given equations, R is expressed as follows:

$R=P\cdot(C\cdot(E\cdot(C^{-1}\cdot G)))=P\cdot C\cdot E\cdot C^{-1}\cdot G$ or $R=T\cdot G$ where $T=P\cdot C\cdot E\cdot C^{-1}$. Note that matrix $C\cdot E\cdot C^{-1}$ is symmetric.

The multiplication of these 8×8 matrices results to $$T = \begin{bmatrix} 0.6376 & 0.2986 & -0.0585 & 0.0241 & -0.0125 & 0.0071 & -0.0039 & 0.0018 \\ 0.4223 & 0.8433 & 0.3227 & -0.0710 & 0.0311 & -0.0164 & 0.0088 & -0.0039 \\ -0.0827 & 0.3227 & 0.8893 & 0.3057 & -0.0624 & 0.0259 & -0.0125 & 0.0053 \\ 0.0341 & -0.0710 & 0.3057 & 0.8978 & 0.3004 & -0.0585 & 0.0223 & -0.0086 \\ -0.0177 & 0.0311 & -0.0624 & 0.3004 & 0.9018 & 0.2969 & -0.0546 & 0.0170 \\ 0.0100 & -0.0164 & 0.0259 & -0.0585 & 0.2969 & 0.9057 & 0.2916 & -0.0460 \\ -0.0056 & 0.0088 & -0.0125 & 0.0223 & -0.0546 & 0.2916 & 0.9143 & 0.2745 \\ 0.0025 & -0.0039 & 0.0053 & -0.0086 & 0.0170 & -0.0460 & 0.2745 & 0.9603 \end{bmatrix}$$

as is shown below.

Thus, in the general case of down-scaling two concatenated N/2 DCT coefficient sequences into one N/2 coefficient sequence:

$T=P\cdot C\cdot E\cdot C^{-1}$ where $P=diag\ \{½, \sqrt{1/2}, \sqrt{1/2}, \ldots\}$ $$E = 2diag\left\{\cos\frac{(2n+1)\pi}{2N}\right\}$$

$$C = \sqrt{\frac{2}{N/2}}\left\{\varepsilon_k \cos\frac{(2n+1)k\pi}{N}\right\}, n, k = 0, 1, \ldots, (N/2)-1$$

All matrices are of size $N/2 \times N/2$.

All matrices are of size N/2×N/2.

In the special case of N=16 the above given matrices become:

$a=\sqrt{1/2}$, $\theta=\pi/N$ $$P = \begin{bmatrix} .5 & 0 & 0 & 0 & 0 & 0 & 0 & 0 \\ 0 & a & 0 & 0 & 0 & 0 & 0 & 0 \\ 0 & 0 & a & 0 & 0 & 0 & 0 & 0 \\ 0 & 0 & 0 & a & 0 & 0 & 0 & 0 \\ 0 & 0 & 0 & 0 & a & 0 & 0 & 0 \\ 0 & 0 & 0 & 0 & 0 & a & 0 & 0 \\ 0 & 0 & 0 & 0 & 0 & 0 & a & 0 \\ 0 & 0 & 0 & 0 & 0 & 0 & 0 & a \end{bmatrix}$$

$$E = 2\begin{bmatrix} \cos(\theta/2) & 0 & 0 & 0 & 0 & 0 & 0 & 0 \\ 0 & \cos(3\theta/2) & 0 & 0 & 0 & 0 & 0 & 0 \\ 0 & 0 & \cos(5\theta/2) & 0 & 0 & 0 & 0 & 0 \\ 0 & 0 & 0 & \cos(7\theta/2) & 0 & 0 & 0 & 0 \\ 0 & 0 & 0 & 0 & \cos(9\theta/2) & 0 & 0 & 0 \\ 0 & 0 & 0 & 0 & 0 & \cos(\theta/2) & 0 & 0 \\ 0 & 0 & 0 & 0 & 0 & 0 & \cos(13\theta/2) & 0 \\ 0 & 0 & 0 & 0 & 0 & 0 & 0 & \cos(15\theta/2) \end{bmatrix}$$

$$C = \sqrt{\frac{2}{N/2}} \begin{bmatrix} \sqrt{1/2} & \sqrt{1/2} & \sqrt{1/2} & \sqrt{1/2} & \sqrt{1/2} & \sqrt{1/2} & \sqrt{1/2} & \sqrt{1/2} \\ \cos(\theta) & \cos(3\theta) & \cos(5\theta) & \cos(7\theta) & \cos(9\theta) & \cos(11\theta) & \cos(13\theta) & \cos(15\theta) \\ \cos(2\theta) & \cos(6\theta) & \cos(10\theta) & \cos(14\theta) & \cos(18\theta) & \cos(22\theta) & \cos(26\theta) & \cos(30\theta) \\ \cos(3\theta) & \cos(9\theta) & \cos(15\theta) & \cos(21\theta) & \cos(27\theta) & \cos(33\theta) & \cos(39\theta) & \cos(45\theta) \\ \cos(4\theta) & \cos(12\theta) & \cos(20\theta) & \cos(28\theta) & \cos(36\theta) & \cos(44\theta) & \cos(52\theta) & \cos(60\theta) \\ \cos(5\theta) & \cos(15\theta) & \cos(25\theta) & \cos(35\theta) & \cos(45\theta) & \cos(55\theta) & \cos(65\theta) & \cos(75\theta) \\ \cos(6\theta) & \cos(18\theta) & \cos(30\theta) & \cos(42\theta) & \cos(54\theta) & \cos(66\theta) & \cos(78\theta) & \cos(90\theta) \\ \cos(7\theta) & \cos(21\theta) & \cos(35\theta) & \cos(49\theta) & \cos(63\theta) & \cos(77\theta) & \cos(91\theta) & \cos(105\theta) \end{bmatrix}$$

and finally $$T = \begin{bmatrix} 0.6376 & 0.2986 & -0.0585 & 0.0241 & -0.0125 & 0.0071 & -0.0039 & 0.0018 \\ 0.4223 & 0.8433 & 0.3227 & -0.0710 & 0.0311 & -0.0164 & 0.0088 & -0.0039 \\ -0.0827 & 0.3227 & 0.8893 & 0.3057 & -0.0624 & 0.0259 & -0.0125 & 0.0053 \\ 0.0341 & -0.0710 & 0.3057 & 0.8978 & 0.3004 & -0.0585 & 0.0223 & -0.0086 \\ -0.0177 & 0.0311 & -0.0624 & 0.3004 & 0.9018 & 0.2969 & -0.0546 & 0.0170 \\ 0.0100 & -0.0164 & 0.0259 & -0.0585 & 0.2969 & 0.9057 & 0.2916 & -0.0460 \\ -0.0056 & 0.0088 & -0.0125 & 0.0223 & -0.0546 & 0.2916 & 0.9143 & 0.2745 \\ 0.0025 & -0.0039 & 0.0053 & -0.0086 & 0.0170 & -0.0460 & 0.2745 & 0.9603 \end{bmatrix}$$

Notice that further improvements can be done, as for example use approximated values for the T matrix or the T matrix can be computed without the $\sqrt{1/2}$ terms of the P matrix. Those terms can be included after the T matrix is computed.

The computational complexity for computing of N/2 out of N points, i.e. downscaling by a factor of 2, is $O_M=N(N+2)/8$ and $O_A=(N(N+6)-1)/8$. For the computation of 8 out of 16 coefficients (i.e. N=16) 36 multiplications and 43 additions are required. More specifically the computation of the even indexed coefficients requires 4 multiplications by $\sqrt{1/2}$ and 4 additions. The computation of $G=Y_1-Z_1'$ requires 8 subtractions and the computation of R requires 32 multiplications and 28 additions (only the upper 4×8 elements of the T matrix are used, since only coefficients $X_i$, i=1, 3, 5, 7 have to be calculated). 3 post additions are needed for calculating the required odd-indexed coefficients from R.

Special Cases a. When only the first 4 out of the 8 coefficients $Y_k$, $Z_k'$ are non-zero (i.e. $Y_k=Z_k'=0$ for k=4, 5, 6, 7), then the above given complexity becomes 20 multiplications and 23 additions. Specifically the computation of the even indexed coefficients requires 4 multiplications by $\sqrt{1/2}$ and 4 additions, the computation of $G=Y_1-Z_1'$ requires 4 subtractions and the computation of R requires 16 multiplications and 12 additions (since only the upper 4×4 elements of the T matrix are used). 3 post additions are needed for calculating the required odd-indexed coefficients from R.

b. In all cases the 4 multiplications by $\sqrt{1/2}$ for the computation of the even-indexed coefficients could be saved by absorbing them into the quantisation stage that follows the TDM stage.

c. A number of operations could also be saved if the values of the T matrix were rounded to the closest power of 2. In such a case shifts could be used instead of multiplications. The exploitation of the shift and add operation existing in all modern DSPs and general purpose CPUs would also increase performance considerably.

Figure 5A:
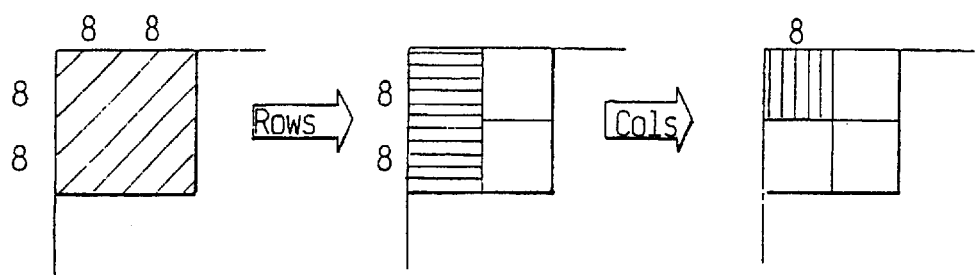
FIGS. 5a and 5b illustrates the down sizing of four adjacent DCT blocks.

In the case of down-scaling 4 adjacent 8×8 DCT blocks down to one 8×8 block, i.e. down-sizing by a factor of 2 in each dimension, by means of the row-column method, the proposed algorithm has to be applied 24 times. I.e. 16 times across the rows and 8 times across the columns as shown in FIG. 5a. This gives a computational complexity of 864 multiplications and 1032 additions or a total of 1896 operations (additions plus multiplications).

Figure 5B:
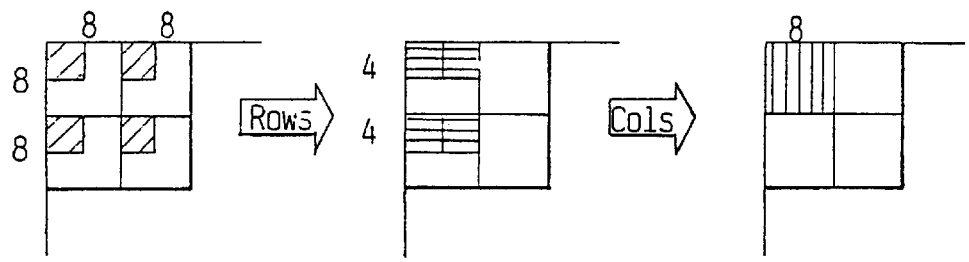

In the special case that only the upper left 4×4 DCT coefficients of each 8×8 block are non-zero, the algorithm has to be applied 16 times only, i.e. 8 times across each dimension, as shown in FIG. 5b. This results to a complexity of 320 multiplications and 368 additions or a total of 688 operations.

The above given complexity figures could be further reduced if approximate values, e.g. powers of 2, for the T matrix elements were used.

Considering that 11 multiplications and 29 additions are needed for each DCT or IDCT computation, a total of 1008 multiplications and 1752 additions or 2760 operations are required for down-scaling four adjacent 8×8 DCT blocks down to one 8×8 block according to the approach depicted in FIG. 3a. The comparison of this complexity to that needed for the case of FIG. 5a, 1896 operations are needed (or 31.3% are saved). In the special case of FIG. 5b, the computational savings are about 64%.

Down-sampling of compressed images in the transform domain is not only advantageous from the computational point of view, but from the obtained picture quality as well. This is due to the fact that a great number of arithmetic and quantisation errors are avoided. The values of the T matrix can be off-line calculated to the desired accuracy and the sum of products for the computation of TG can also be calculated to the desired accuracy. No intermediate calculation steps of lower accuracy are needed.

The method can also be used for downscaling of video sequences in standards like H.261/263, MPEG 1/2/4. The application of the method is scalable video coding, as in frequency scalability schemes is also possible, as described in PCT/SE98/00448.

Also, in transcoder applications, a transcoder can be arranged to downscale the compressed images. For example, in video transcoding the method as described herein can be used for intra and inter macroblocks in video coding standards. In that case the motion vectors are scaled accordingly.

Thus, by using the algorithm as described herein encoding and decoding when processing digital images in the compressed domain many advantages in terms of processing speed, storage efficiency and image quality are obtained.

What is claimed is:

1. An encoder having means for calculating the DCT of a sequence of length N/2, N being a positive, even integer, and having means for calculating a DCT of length N directly from two sequences of length N/2 representing the first and second half of an original sequence of length N, characterised in that the means for calculating DCTs of length N/2 are arranged to calculate the even coefficients of a DCT of length N as:

$$X_{2k} = \sqrt{\frac{2}{N}} \varepsilon_{2k} \sum_{n=0}^{N-1} x_n \cos\frac{(2n+1)2k\pi}{2N}$$

$$= \sqrt{\frac{2}{N}} \varepsilon_k \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos\frac{(2n+1)k\pi}{2(N/2)} + \sum_{n=0}^{\frac{N}{2}-1} x_{N-1-n} \cos\left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\}$$

$$= \sqrt{\frac{1}{2}} [Y_k + (-1)^k Z_k] = \sqrt{\frac{1}{2}} [Y_k + Z'_k] \quad k = 0, 1, \ldots, (N/2)-1.$$

where $Z'_k$ is the DCT of $z'_n = x_{N-1-n}, n = 0, 1, \ldots, (N/2)-1$.

And the odd index coefficients as $$X_{2k+1} + X_{2k-1} = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} (y_n - z'_n) 2\cos\frac{(2n+1)\pi}{2N} \cos\frac{(2n+1)k\pi}{2(N/2)} \right\} \text{ or}$$

$$X_{2k+1} = \frac{1}{\varepsilon_k} \sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} - X_{2k-1},$$

where $k = 0, 1, \ldots, (N/2)-1$ and $$r_n = (y_n - z'_n) 2\cos\frac{(2n+1)\pi}{2N}$$

$$= \left\{ \sqrt{\frac{2}{N/2}} \sum_{l=0}^{\frac{N}{2}-1} \varepsilon_l (Y_l - Z'_l) \cos\frac{(2n+1)l\pi}{2(N/2)} \right\} 2\cos\frac{(2n+1)\pi}{2N}.$$

2. An encoder having means for calculating the DCT of a sequence of length N/2×N/2, N being a positive, even integer having means for calculating an N×N DCT directly from four DCTs of length (N/2×N/2) representing the DCTs of four adjacent blocks constituting the N×N block, characterised in that the means for calculating DCTs of length N/2 are arranged to calculate the even coefficients of a DCT of length N as:

$$X_{2k} = \sqrt{\frac{2}{N}} \varepsilon_{2k} \sum_{n=0}^{N-1} x_n \cos\frac{(2n+1)2k\pi}{2N}$$

$$= \sqrt{\frac{2}{N}} \varepsilon_k \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos\frac{(2n+1)k\pi}{2(N/2)} + \sum_{n=0}^{\frac{N}{2}-1} x_{N-1-n} \cos\left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\}$$

$$= \sqrt{\frac{1}{2}} [Y_k + (-1)^k Z_k] = \sqrt{\frac{1}{2}} [Y_k + Z'_k] \quad k = 0, 1, \ldots, (N/2)-1.$$

where $Z'_k$ is the DCT of $z'_n = x_{N-1-n}, n = 0, 1, \ldots, (N/2)-1.$

And the odd index coefficients as $$X_{2k+1} + X_{2k-1} = = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k}\sqrt{\frac{1}{2}} \left\{ \sqrt{\frac{2}{N/2}} \varepsilon_k \sum_{n=0}^{\frac{N}{2}-1} (y_n - z'_n) \right.$$

$$\left. 2\cos\frac{(2n+1)\pi}{2N} \cos\frac{(2n+1)k\pi}{2(N/2)} \right\} \text{ or }$$

$$X_{2k+1} = \frac{1}{\varepsilon_k}\sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} - X_{2k-1},$$

where $k = 0, 1, \ldots, (N/2) - 1$ and $$r_n = (y_n - z'_n) 2\cos\frac{(2n+1)\pi}{2N}$$

$$= \left\{ \sqrt{\frac{2}{N/2}} \sum_{l=0}^{\frac{N}{2}-1} \varepsilon_l(Y_l - Z'_l)\cos\frac{(2n+1)l\pi}{2(N/2)} \right\} 2\cos\frac{(2n+1)\pi}{2N}.$$

3. An encoder according to claim 1, characterised in that N is equal to $2^m$, m being a positive integer>0.

4. A decoder having means for calculating the DCT of a sequence of length N/2, N being a positive, even integer having means for calculating a DCT of length N directly from two sequences of length N/2 representing the first and second half of an original sequence of length N, characterised in that the means for calculating DCTs of length N/2 are arranged to calculate the even coefficients of a DCT of length N as:

$$X_{2k} = \sqrt{\frac{2}{N}} \varepsilon_{2k} \sum_{n=0}^{N-1} x_n \cos\frac{(2n+1)2k\pi}{2N}$$

$$= \sqrt{\frac{2}{N}} \varepsilon_k \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos\frac{(2n+1)k\pi}{2(N/2)} + \right.$$

$$\left. \sum_{n=0}^{\frac{N}{2}-1} x_{N-1-n} \cos\left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \right.$$

$$\left. \sqrt{\frac{2}{N/2}} \varepsilon_k \sum_{n=0}^{\frac{N}{2}-1} z_n \cos\frac{(2n+1)k\pi}{2(N/2)} \right\}$$

$$= \sqrt{\frac{1}{2}} [Y_k + (-1)^k Z_k] = \sqrt{\frac{1}{2}} [Y_k + Z'_k] \quad k = 0, 1, \ldots, (N/2) - 1.$$

where $Z'_k$ is the DCT of $z'_n = x_{N-1-n}, n = 0, 1, \ldots, (N/2) - 1$.

And the odd index coefficients as $$X_{2k+1} + X_{2k-1} = = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k}\sqrt{\frac{1}{2}} \left\{ \sqrt{\frac{2}{N/2}} \varepsilon_k \sum_{n=0}^{\frac{N}{2}-1} (y_n - z'_n) \right.$$

$$\left. 2\cos\frac{(2n+1)\pi}{2N} \cos\frac{(2n+1)k\pi}{2(N/2)} \right\} \text{ or }$$

$$X_{2k+1} = \frac{1}{\varepsilon_k}\sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} - X_{2k-1},$$

where $k = 0, 1, \ldots, (N/2) - 1$ and $$r_n = (y_n - z'_n) 2\cos\frac{(2n+1)\pi}{2N}$$

$$= \left\{ \sqrt{\frac{2}{N/2}} \sum_{l=0}^{\frac{N}{2}-1} \varepsilon_l(Y_l - Z'_l)\cos\frac{(2n+1)l\pi}{2(N/2)} \right\} 2\cos\frac{(2n+1)\pi}{2N}.$$

5. A decoder having means for calculating the DCT of a sequence of length N/2×N/2, N being a positive, even integer having means for calculating an N×N DCT directly from four DCTs of length (N/2×N/2) representing the DCTs of four adjacent blocks constituting the N×N block, characterised in that the means for calculating DCTs of length N/2 are arranged to calculate the even coefficients of a DCT of length N as:

$$X_{2k} = \sqrt{\frac{2}{N}} \varepsilon_{2k} \sum_{n=0}^{N-1} x_n \cos\frac{(2n+1)2k\pi}{2N}$$

$$= \sqrt{\frac{2}{N}} \varepsilon_k \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos\frac{(2n+1)k\pi}{2(N/2)} + \right.$$

$$\left. \sum_{n=0}^{\frac{N}{2}-1} x_{N-1-n} \cos\left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \right.$$

$$\left. \sqrt{\frac{2}{N/2}} \varepsilon_k \sum_{n=0}^{\frac{N}{2}-1} z_n \cos\frac{(2n+1)k\pi}{2(N/2)} \right\}$$

$$= \sqrt{\frac{1}{2}} [Y_k + (-1)^k Z_k] = \sqrt{\frac{1}{2}} [Y_k + Z'_k] \quad k = 0, 1, \ldots, (N/2) - 1.$$

where $Z'_k$ is the DCT of $z'_n = x_{N-1-n}, n = 0, 1, \ldots, (N/2) - 1$.

And the odd index coefficients as $$X_{2k+1} + X_{2k-1} = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k}\sqrt{\frac{1}{2}} \left\{ \sqrt{\frac{2}{N/2}} \varepsilon_k \sum_{n=0}^{\frac{N}{2}-1}(y_n - z'_n) \right.$$

$$\left. 2\cos\frac{(2n+1)\pi}{2N}\cos\frac{(2n+1)k\pi}{2(N/2)} \right\} \text{ or }$$

$$X_{2k+1} = \frac{1}{\varepsilon_k}\sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} - X_{2k-1},$$

where $k = 0, 1, \ldots, (N/2)-1$ and $$r_n = (y_n - z'_n)2\cos\frac{(2n+1)\pi}{2N}$$

$$= \left\{ \sqrt{\frac{2}{N/2}} \sum_{l=0}^{\frac{N}{2}-1} \varepsilon_l(Y_l - Z'_l)\cos\frac{(2n+1)l\pi}{2(N/2)} \right\} 2\cos\frac{(2n+1)\pi}{2N}.$$

6. A decoder according to claim 1, characterised in that N is equal to $2^m$, m being a positive integer>0.

7. A transcoder comprising an encoder or decoder according to claim 1.

8. A transcoder according to claim 7, characterised in that the transcoder is arranged to downscale a compressed image.

9. A system for transmitting DCT transformed image or video data comprising an encoder or decoder according to claim 1.

10. A method of encoding an image in the compressed (DCT) domain, using DCTs of lengths N/2 and wherein the compressed frames are undersampled by a certain factor in each dimension, wherein an N×N DCT is directly calculated from 4 adjacent N/2×N/2 blocks of DCT coefficients of the incoming compressed frames, N being a positive, even integer, characterised in that the even coefficients of a DCT of length N are calculated as:

$$X_{2k} = \sqrt{\frac{2}{N}} \varepsilon_{2k} \sum_{n=0}^{N-1} x_n \cos\frac{(2n+1)2k\pi}{2N}$$

$$= \sqrt{\frac{2}{N}} \varepsilon_k \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\}$$

$$= \sqrt{\frac{2}{N}} \varepsilon_k \left\{ \sum_{n=0}^{\frac{N}{2}-1} y_n \cos\frac{(2n+1)k\pi}{2(N/2)} + \sum_{n=0}^{\frac{N}{2}-1} x_{N-1-n}\cos\left[\frac{[2(N-1-n)+1]k\pi}{2(N/2)}\right] \right\}$$

$$= \sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\}$$

-continued $$= \sqrt{\frac{1}{2}}[Y_k + (-1)^k Z_k] = \sqrt{\frac{1}{2}}[Y_k + Z'_k] \quad k = 0, 1, \ldots, (N/2)-1.$$

where $Z'_k$ is the DCT of $z'_n = x_{N-1-n}$, $n = 0, 1, \ldots, (N/2)-1$.

And the odd index coefficients as $$X_{2k+1} + X_{2k-1} = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k}\sqrt{\frac{1}{2}} \left\{ \sqrt{\frac{2}{N/2}} \varepsilon_k \sum_{n=0}^{\frac{N}{2}-1}(y_n - z'_n) \right.$$

$$\left. 2\cos\frac{(2n+1)\pi}{2N}\cos\frac{(2n+1)k\pi}{2(N/2)} \right\} \text{ or }$$

$$X_{2k+1} = \frac{1}{\varepsilon_k}\sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} - X_{2k-1},$$

where $k = 0, 1, \ldots, (N/2)-1$ and $$r_n = (y_n - z'_n)2\cos\frac{(2n+1)\pi}{2N}$$

$$= \left\{ \sqrt{\frac{2}{N/2}} \sum_{l=0}^{\frac{N}{2}-1} \varepsilon_l(Y_l - Z'_l)\cos\frac{(2n+1)l\pi}{2(N/2)} \right\} 2\cos\frac{(2n+1)\pi}{2N}.$$

11. A method of encoding an image represented as a DCT transformed sequence of length N, N being a positive, even integer, wherein the DCT is calculated directly from two sequences of length N/2 representing the first and second half of the original sequence of length N, characterised in that the even coefficients of a DCT of length N are calculated as:

$$X_{2k} = \sqrt{\frac{2}{N}} \varepsilon_{2k} \sum_{n=0}^{N-1} x_n \cos\frac{(2n+1)2k\pi}{2N} =$$

$$\sqrt{\frac{2}{N}} \varepsilon_{2k} \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\} = \sqrt{\frac{2}{N}} \varepsilon_k$$

$$\left\{ \sum_{n=0}^{\frac{N}{2}-1} y_n \cos\frac{(2n+1)k\pi}{2(N/2)} + \sum_{n=0}^{\frac{N}{2}-1} x_{N-1-n}\cos\left[\frac{[2(N-1-n)+1]k\pi}{2(N/2)}\right] \right\} =$$

$$\sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\} =$$

$$\sqrt{\frac{1}{2}}[Y_k + (-1)^k Z_k] = \sqrt{\frac{1}{2}}[Y_k + Z'_k] \quad k = 0, 1, \ldots, (N/2)-1$$

where $Z'_k$ is the DCT of $z'_n = x_{N-1-n}$, $n = 0, 1, \ldots, (N/2)-1$.

And the odd index coefficients as $$X_{2k+1} + X_{2k-1} = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k}\sqrt{\frac{1}{2}} \left\{ \sqrt{\frac{2}{N/2}} \varepsilon_k \sum_{n=0}^{\frac{N}{2}-1} (y_n - z'_n) \right.$$

$$\left. 2\cos\frac{(2n+1)\pi}{2N} \cos\frac{(2n+1)k\pi}{2(N/2)} \right\} \text{ or}$$

$$X_{2k+1} = \frac{1}{\varepsilon_k}\sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} - X_{2k-1},$$

where $k = 0, 1, \ldots, (N/2) - 1$ and $$r_n = (y_n - z'_n) 2\cos\frac{(2n+1)\pi}{2N}$$

$$= \left\{ \sqrt{\frac{2}{N/2}} \sum_{l=0}^{\frac{N}{2}-1} \varepsilon_l(Y_l - Z'_l)\cos\frac{(2n+1)l\pi}{2(N/2)} \right\} 2\cos\frac{(2n+1)\pi}{2N}$$

12. A method according to claim 10 characterised in that N is equal to $2^m$, m being a positive integer>0.

13. A method of decoding an image represented as a DCT transformed sequence of length N, N being a positive, even integer, wherein the DCT is calculated directly from two sequences of length N/2 representing the first and second half of the original sequence of length N, characterised in that the even coefficients of a DCT of length N are calculated as:

$$X_{2k} = \sqrt{\frac{2}{N}} \varepsilon_{2k} \sum_{n=0}^{N-1} x_n \cos\frac{(2n+1)2k\pi}{2N} =$$

$$\sqrt{\frac{2}{N}} \varepsilon_{2k} \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\} =$$

$$\sqrt{\frac{2}{N}} \varepsilon_k \left\{ \sum_{n=0}^{\frac{N}{2}-1} y_n \cos\frac{(2n+1)k\pi}{2(N/2)} + \sum_{n=0}^{\frac{N}{2}-1} x_{N-1-n} \cos\left[\frac{[2(N-1-n)+1-k\pi]}{2(N/2)}\right] \right\} =$$

$$\sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\} =$$

$$\sqrt{\frac{1}{2}}[Y_k + (-1)^k Z_k] = \sqrt{\frac{1}{2}}[Y_k + Z'_k] \quad k = 0, 1, \ldots, (N/2) - 1.$$

where $Z'_k$ is the DCT of $z'_n = x_{N-1-n}, n = 0, 1, \ldots, (N/2) - 1.$

And the odd index coefficients as $$X_{2k+1} + X_{2k-1} = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k}\sqrt{\frac{1}{2}} \left\{ \sqrt{\frac{2}{N/2}} \varepsilon_k \sum_{n=0}^{\frac{N}{2}-1} (y_n - z'_n) \right.$$

$$\left. 2\cos\frac{(2n+1)\pi}{2N} \cos\frac{(2n+1)k\pi}{2(N/2)} \right\} \text{ or}$$

$$X_{2k+1} = \frac{1}{\varepsilon_k}\sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} - X_{2k-1},$$

where $k = 0, 1, \ldots, (N/2) - 1$ and $$r_n = (y_n - z'_n) 2\cos\frac{(2n+1)\pi}{2N}$$

$$= \left\{ \sqrt{\frac{2}{N/2}} \sum_{l=0}^{\frac{N}{2}-1} \varepsilon_l(Y_l - Z'_l)\cos\frac{(2n+1)l\pi}{2(N/2)} \right\} 2\cos\frac{(2n+1)\pi}{2N}$$

14. A method of decoding an image in the compressed (DCT) domain, using DCTs of lengths N/2 and wherein the compressed frames are undersampled by a certain factor in each dimension, wherein an N×N DCT is directly calculated from 4 adjacent N/2×N/2 blocks of DCT coefficients of the incoming compressed frames, N being a positive, even integer, characterised in that the even coefficients of a DCT of length N are calculated as:

$$X_{2k} = \sqrt{\frac{2}{N}} \varepsilon_{2k} \sum_{n=0}^{N-1} x_n \cos\frac{(2n+1)2k\pi}{2N} =$$

$$\sqrt{\frac{2}{N}} \varepsilon_{2k} \left\{ \sum_{n=0}^{\frac{N}{2}-1} x_n \cos\frac{(2n+1)k\pi}{2(N/2)} + \sum_{n=N/2}^{N-1} x_n \cos\frac{(2n+1)k\pi}{2(N/2)} \right\} =$$

$$\sqrt{\frac{2}{N}} \varepsilon_k \left\{ \sum_{n=0}^{\frac{N}{2}-1} y_n \cos\frac{(2n+1)k\pi}{2(N/2)} + \sum_{n=0}^{\frac{N}{2}-1} x_{N-1-n} \cos\left[\frac{[2(N-1-n)+1-k\pi]}{2(N/2)}\right] \right\} =$$

$$\sqrt{\frac{1}{2}} \left\{ \sqrt{\frac{2}{N/2}} \varepsilon_k \sum_{n=0}^{\frac{N}{2}-1} y_n \cos\frac{(2n+1)k\pi}{2(N/2)} + \sqrt{\frac{2}{N/2}} \varepsilon_k \sum_{n=0}^{\frac{N}{2}-1} z_n \cos\frac{(2n+1)k\pi}{2(N/2)} \right\} =$$

$$\sqrt{\frac{1}{2}}[Y_k + (-1)^k Z_k] = \sqrt{\frac{1}{2}}[Y_k + Z'_k] \quad k = 0, 1, \ldots, (N/2) - 1.$$

where $Z'_k$ is the DCT of $z'_n = x_{N-1-n}, n = 0, 1, \ldots, (N/2) - 1.$

And the odd index coefficients as $$X_{2k+1} + X_{2k-1} = \sqrt{\frac{2}{N}} \left\{ \sum_{n=0}^{N-1} x_n \cos\frac{(2n+1)(2k+1)\pi}{2N} + \sum_{n=0}^{N-1} x_n \cos\frac{(2n+1)(2k-1)\pi}{2N} \right\}$$

$$= \frac{1}{\varepsilon_k} \sqrt{\frac{1}{2}} \left\{ \sqrt{\frac{2}{N/2}} \varepsilon_k \sum_{n=0}^{\frac{N}{2}-1} (y_n - z'_n) 2\cos\frac{(2n+1)\pi}{2N} \cos\frac{(2n+1)k\pi}{2(N/2)} \right\} \text{ or}$$

$$X_{2k+1} = \frac{1}{\varepsilon_k} \sqrt{\frac{1}{2}} \left\{ \sqrt{\frac{2}{N/2}} \varepsilon_k \sum_{n=0}^{\frac{N}{2}-1} r_n \cos\frac{(2n+1)k\pi}{2(N/2)} \right\} - X_{2k-1},$$

where $k = 0, 1, \ldots, (N/2) - 1$ and $$r_n = (y_n - z'_n) 2\cos\frac{(2n+1)\pi}{2N}$$

$$= \left\{ \sqrt{\frac{2}{N/2}} \sum_{l=0}^{\frac{N}{2}-1} \varepsilon_l (Y_l - Z'_l) \cos\frac{(2n+1)l\pi}{2(N/2)} \right\} 2\cos\frac{(2n+1)\pi}{2N}$$

15. A method according to claim 13, characterised in that N is equal to $2^m$, m being a positive integer>0.

16. An encoder according to claim 2, characterised in that N is equal to $2^m$, m being a positive integer>0.

17. A decoder according to claim 5, characterised in that N is equal to $2^m$, m being a positive integer>0.

18. A transcoder comprising an encoder or decoder according to claim 2.

19. A transcoder comprising an encoder or decoder according to claim 4.

20. A transcoder comprising an encoder or decoder according to claim 5.

21. A system for transmitting DCT transformed image or video data comprising an encoder or decoder according to claim 2.

22. A system for transmitting DCT transformed image or video data comprising an encoder or decoder according to claim 4.

23. A system for transmitting DCT transformed image or video data comprising an encoder or decoder according to claim 5.

24. A method according to claim 11, characterised in the N is equal to $2^m$, m being a positive integer>0.

25. A method according to claim 14, characterised in the N is equal to $2^m$, m being a positive integer>0.

26. A transcoder according to claim 7, wherein the transcoder is arranged to downscale a compressed image.

27. A transcoder according to claim 18, wherein the transcoder is arranged to downscale a compressed image.

28. A transcoder according to claim 19, wherein the transcoder is arranged to downscale a compressed image.

29. A transcoder according to claim 20, wherein the transcoder is arranged to downscale a compressed image.

30. A transcoder according to claim 21, wherein the transcoder is arranged to downscale a compressed image.

* * * * *

UNITED STATES PATENT AND TRADEMARK OFFICE
CERTIFICATE OF CORRECTION

PATENT NO. : 6,868,188 B2
DATED : March 15, 2005
INVENTOR(S) : Skodras et al.

It is certified that error appears in the above-identified patent and that said Letters Patent is hereby corrected as shown below:

<u>Title page,</u>
Item [22], PCT Filed, should be -- December 12, 2000 --

Signed and Sealed this

Thirty-first Day of May, 2005

JON W. DUDAS
*Director of the United States Patent and Trademark Office*